US011878229B2

(12) United States Patent
Liu et al.

(10) Patent No.: US 11,878,229 B2
(45) Date of Patent: Jan. 23, 2024

(54) STROKE DECISION DEVICE, STROKE DECISION METHOD, RECORDING MEDIUM STORING STROKE DECISION PROGRAM, AND BALL-RETURNING ROBOT

(71) Applicant: OMRON Corporation, Kyoto (JP)

(72) Inventors: Xiaojun Liu, Kizugawa (JP); Kyohei Asai, Kyotanabe (JP); Masamune Nakayama, Kizugawa (JP); Satoshi Yase, Kizugawa (JP)

(73) Assignee: OMRON CORPORATION, Kyoto (JP)

(*) Notice: Subject to any disclaimer, the term of this patent is extended or adjusted under 35 U.S.C. 154(b) by 310 days.

(21) Appl. No.: 17/196,044

(22) Filed: Mar. 9, 2021

(65) Prior Publication Data
US 2021/0283484 A1 Sep. 16, 2021

(30) Foreign Application Priority Data

Mar. 13, 2020 (JP) .................. 2020-044282

(51) Int. Cl.
*A63B 69/40* (2006.01)
*A63B 102/16* (2015.01)
*A63B 67/04* (2006.01)

(52) U.S. Cl.
CPC ............. *A63B 69/40* (2013.01); *A63B 67/04* (2013.01); *A63B 2102/16* (2015.10); *A63B 2220/05* (2013.01); *A63B 2220/807* (2013.01)

(58) Field of Classification Search
None
See application file for complete search history.

(56) References Cited

U.S. PATENT DOCUMENTS 6,406,386 B1 * 6/2002 Brazzell ............... A63B 69/406
124/78
7,066,845 B2 * 6/2006 Joseph ............... A63B 69/0071
124/78

(Continued)

FOREIGN PATENT DOCUMENTS

CN 108527314 A * 9/2018 ............. A63B 69/00

OTHER PUBLICATIONS

Zhu et al, Towards High Level Skill Learning: Learn to Return Table Tennis Ball Using Monte-Carlo Based Policy Gradient Method, Aug. 1-5, 2018, https://ieeexplore.ieee.org/stamp/stamp.jsp?tp=&arnumber=8621776 , pp. 44-51 (Year: 2018).*
Nakashima et al, An Online Trajectory Planning of Struck Ball with Spin by Table Tennis Robot, Jul. 8-11, 2014, https://ieeexplore.ieee.org/stamp/stamp.jsp?arnumber=6878188 , pp. 865-870 (Year: 2014).*

(Continued)

*Primary Examiner* — Tramar Harper
(74) *Attorney, Agent, or Firm* — Morgan, Lewis & Bockius LLP

(57) ABSTRACT

A stroke decision device 30 includes an acquisition section 31 configured to acquire state information including a position, a velocity, and a rotational velocity of an incoming ball, and a stroke decision section 32 configured to decide a stroke condition including a position, a velocity, and an orientation of a striking implement at a time point when hitting back the ball toward a target arrival position, based on the state information for the ball and the target arrival position when hitting back the ball with the striking implement.

10 Claims, 8 Drawing Sheets

(56) References Cited

U.S. PATENT DOCUMENTS

| | | | |
|---|---|---|---|
| 8,758,174 B2* | 6/2014 | Thoman | A63B 69/406 |
| | | | 473/459 |
| 2008/0312772 A1* | 12/2008 | Hasegawa | G06N 3/008 |
| | | | 901/1 |
| 2018/0322365 A1* | 11/2018 | Yehezkel Rohekar | ............... |
| | | | G06N 3/045 |
| 2018/0330200 A1* | 11/2018 | Shibata | G06F 18/241 |
| 2019/0132708 A1* | 5/2019 | Belghoul | H04L 12/1845 |
| 2020/0151576 A1* | 5/2020 | Gajewski | G06N 3/086 |
| 2020/0166952 A1* | 5/2020 | Wang | G07C 5/008 |
| 2023/0009354 A1* | 1/2023 | DeCarlo | G06V 40/23 |

OTHER PUBLICATIONS

Zhu et al., "Towards High Level Skill Learning: Learn to Return Table Tennis Ball Using Monte-Carlo Based Policy Gradient Method," 2018 IEEE International Conference on Real-Time Computing and Robotics (RCAR), IEEE, (2018).

Nakashima et al., "An online trajectory planning of struck ball with spin by table tennis robot," IEEE/ASME International Conference on Advanced Intelligent Mechatronics, IEEE, 865-870 (2014).

Extended European Search Report issued in corresponding European Patent Application No. 21161834.3 dated Aug. 18, 2021.

Chunfang Liu, "Racket Control and Spinning Ball Measurement for Table Tennis Robot," Dissertation, Department of Mechanical Science and Engineering, Graduate School of Engineering, Nagoya University, Nagoya, Japan (2013).

\* cited by examiner

STROKE DECISION DEVICE, STROKE DECISION METHOD, RECORDING MEDIUM STORING STROKE DECISION PROGRAM, AND BALL-RETURNING ROBOT

CROSS-REFERENCE TO RELATED APPLICATION

This application is based on and claims the benefit of priority of the prior Japanese Patent Application No. 2020-044282, filed on Mar. 13, 2020, the entire contents of which are incorporated herein by reference.

BACKGROUND

Technical Field

Technology disclosed herein relates to a stroke decision device, a stroke decision method, a stroke decision program, and a ball-returning robot.

Related Art

Non-Patent Document 1 describes a method for reducing the processing load when deciding a stroke for a table tennis robot that returns an incoming ball by employing simple aerodynamic modeling that does not require input of a rotational velocity.

Non-Patent Document 1: Racket Control and Spinning Ball Measurement for Table Tennis Robot, Chunfang L I U, Nagoya University, March 2013, URL: https://nagoya.repo.nii.ac.jp/?action=repository_action_common_download&item_id=16278&item_no=1&attribute_id=17&file_no=1

Technical Problem

However, since the technology described in Non-Patent Document 1 does not take rotational velocity into consideration, it is difficult for the table tennis robot to predict a pre-strike and post-strike trajectory of the ball when returning the ball with good precision if the ball is applied with spin. This makes it difficult to decide on a stroke that is capable of returning the ball to a target arrival position with good precision.

SUMMARY

In consideration of the above circumstances, an object of technology disclosed herein is to provide a stroke decision device, a stroke decision method, a stroke decision program, and a ball-returning robot capable of deciding on a stroke that is capable of returning a ball to a target arrival position with good precision even when the ball is applied with spin.

Solution to Problem

A first aspect of technology disclosed herein is a stroke decision device including an acquisition section configured to acquire state information including a position, a velocity, and a rotational velocity of an incoming ball, and a stroke condition decision section configured to decide a stroke condition including a position, a velocity, and an orientation of a striking implement at a time point when hitting back the ball toward a target arrival position, based on the state information for the ball and the target arrival position when hitting back the ball with the striking implement.

In the first aspect, configuration may be made wherein the stroke condition decision section includes a trajectory prediction section configured to compute trajectory information relating to a predicted trajectory of the incoming ball based on the state information for the ball, a setting section configured to employ the trajectory information to set a strike position of the ball and to set post-strike state information including a post-strike velocity and a post-strike rotational velocity of the ball immediately after being struck, an arrival position prediction section configured to compute a predicted arrival position based on the post-strike state information, an adjustment section configured to adjust the post-strike velocity such that an error between the predicted arrival position and the target arrival position comes within a permitted range, and a stroke condition computation section configured to compute a velocity and an orientation of the striking implement such that the ball will conform to the post-strike state information when the ball conforming to the state information immediately prior to being struck is struck at the strike position.

In the first aspect, configuration may be made wherein the setting section is further configured to set either a target duration to arrival, this being a duration spanning from when the ball is struck to when the ball arrives at the target arrival position, or a target arrival velocity, this being a velocity of the ball immediately prior to arriving at the target arrival position, and also configured to set an initial value of the post-strike velocity prior to adjustment by the adjustment section based on the target duration to arrival or the target arrival velocity.

In the first aspect, configuration may be made wherein the setting section is configured to set the target duration to arrival or the target arrival velocity within a range that does not require a ball-returning robot provided with the striking implement to perform a strike action at a velocity exceeding a velocity limit for the strike action.

In the first aspect, configuration may be made wherein the adjustment section is configured to employ a search algorithm so as to adjust the post-strike velocity such that the error is minimized.

In the first aspect, configuration may be made wherein the setting section is configured to set plural of the post-strike velocities, the arrival position prediction section is configured to compute plural of the predicted arrival positions corresponding to the plural post-strike velocities, and the adjustment section is configured to adjust the post-strike velocity by selecting from out of the plural post-strike velocities one of the post-strike velocities for which the corresponding error is within the permitted range.

In the first aspect, configuration may be made wherein the acquisition section is further configured to acquire an actual arrival position where the ball actually arrives, and the adjustment section is further configured to correct the adjusted post-strike velocity based on an error between the actual arrival position and the predicted arrival position.

In the first aspect, configuration may be made wherein the acquisition section is further configured to acquire an actual arrival position where the ball actually arrives, and the stroke condition computation section is further configured to correct the computed stroke condition for a next stroke onwards based on an error between the actual arrival position and the predicted arrival position.

In the first aspect, configuration may be made wherein the stroke condition decision section is a trained model trained using the state information and the target arrival position as inputs and having the stroke condition as an output.

A second aspect of technology disclosed herein is a stroke decision method in which a computer executes processing, the processing including acquiring state information including a position, a velocity, and a rotational velocity of an incoming ball, and deciding a stroke condition including a position, a velocity, and an orientation of a striking implement at a time point when hitting back the ball, based on the state information for the ball and a target arrival position when hitting back the ball with the striking implement.

A third aspect of technology disclosed herein is a stroke decision program that causes a computer to execute processing, the processing including acquiring state information including a position, a velocity, and a rotational velocity of an incoming ball, and deciding a stroke condition including a position, a velocity, and an orientation of a striking implement at a time point when hitting back the ball, based on the state information for the ball and a target arrival position when hitting back the ball with the striking implement.

A fourth aspect of technology disclosed herein is a ball-returning robot including the stroke decision device of the first aspect, a striking implement to hit back an incoming ball, a movable section configured to support and move the striking implement, and a control device configured to control movement of the movable section so as to hit back the ball with a stroke condition decided by the stroke decision device.

Advantageous Effects of Invention

The technology disclosed herein is capable of deciding on a stroke that is capable of returning a ball to a target arrival position with good precision even when the ball is applied with spin.

DESCRIPTION OF EMBODIMENTS

Figure 1:
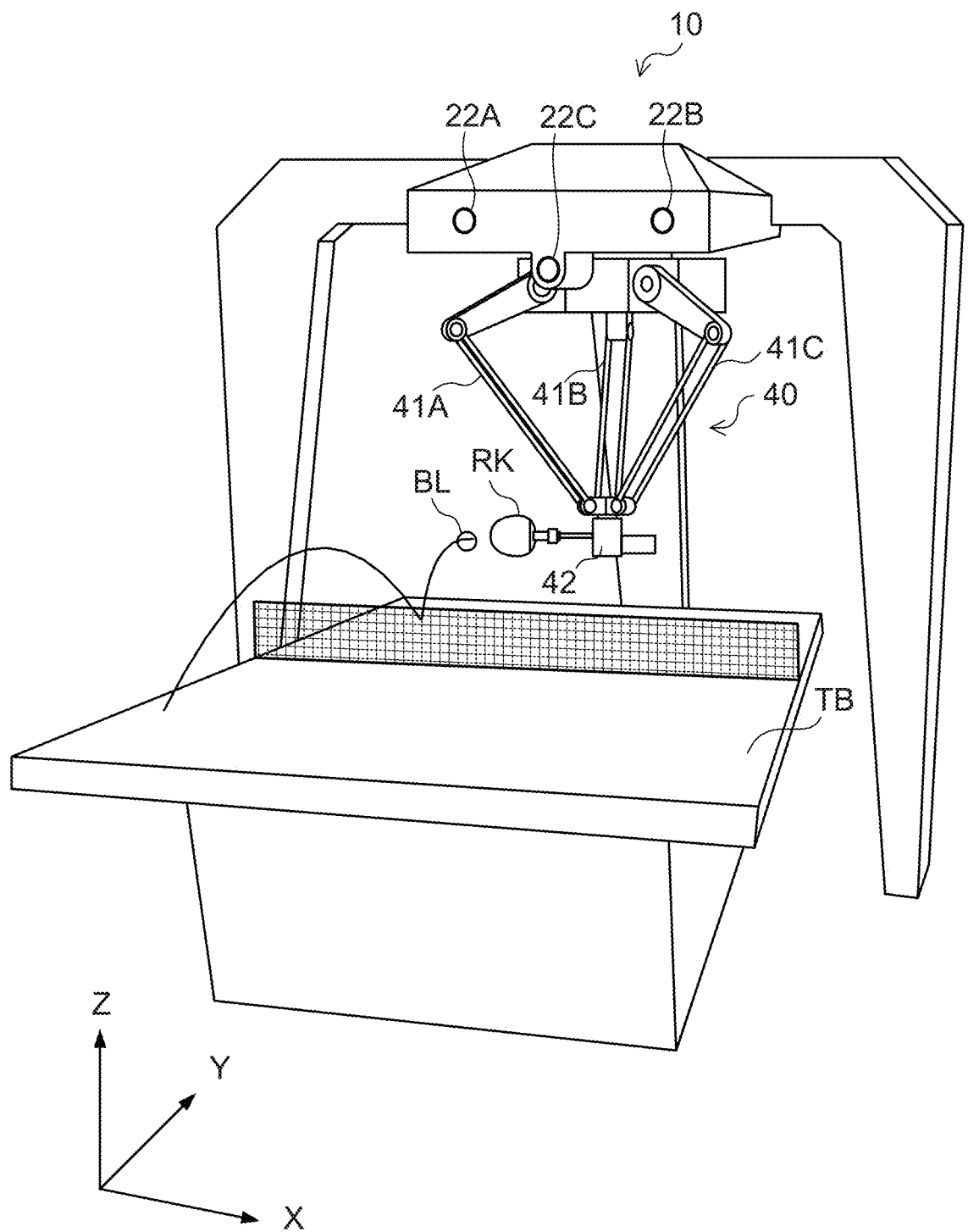
FIG. 1 is an external view of a ball-returning robot.

Explanation follows regarding an example of an exemplary embodiment of technology disclosed herein, with reference to the drawings. Note that the same or equivalent configuration elements and components are allocated the same reference numerals in each of the drawings. The dimensional proportions illustrated in the drawings may be exaggerated in order to aid explanation, and do not necessarily conform to actual proportions.

Figure 2:
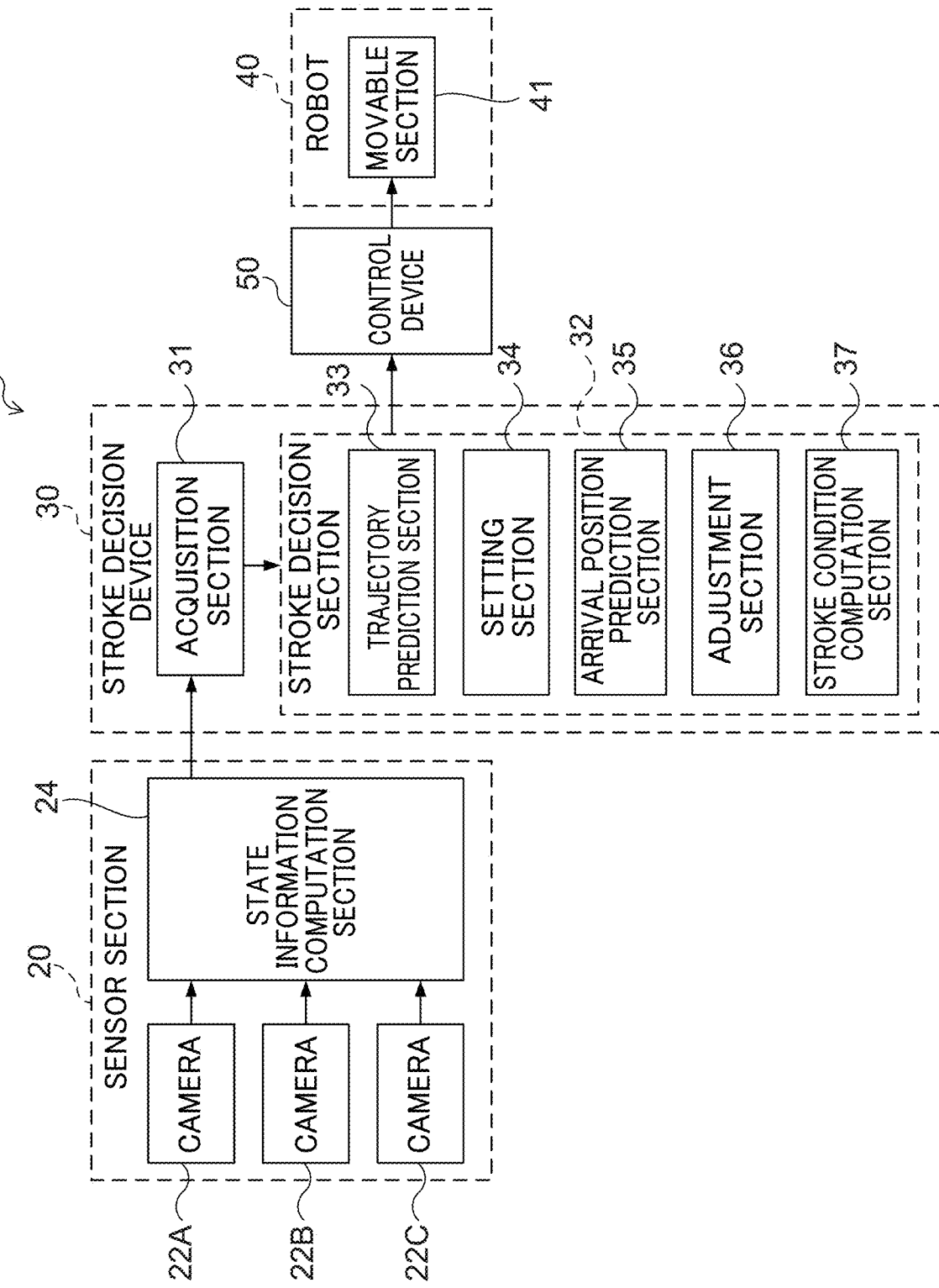
FIG. 2 is a functional block diagram for a ball-returning robot.

FIG. 1 is an external view of a ball-returning robot 10. FIG. 2 is a block diagram illustrating the ball-returning robot 10. The ball-returning robot 10 is a robot that hits back an incoming ball with a striking implement. In the present exemplary embodiment, explanation is given regarding an example in which the ball-returning robot 10 is a table tennis robot. Namely, the ball-returning robot 10 is a table tennis robot that uses a racket RK, serving as a striking implement, to hit back an incoming table tennis ball BL hit by a non-illustrated user after the ball BL has bounced off a table tennis table TB.

As illustrated in FIG. 1 and FIG. 2, the ball-returning robot 10 includes a sensor section 20, a stroke decision device 30, a robot 40, and a control device 50.

The sensor section 20 detects state information including the position, velocity, and rotational velocity of the incoming ball BL. In the present exemplary embodiment, as illustrated in FIG. 1 and FIG. 2, the sensor section 20 includes three cameras 22A, 22B, and 22C, and a state information computation section 24. Note that in the present exemplary embodiment, explanation follows regarding an example in which the rotational velocity is an angular velocity (rad/s).

The cameras 22A, 22B are installed at positions capable of imaging the ball BL from different angles at a predetermined framerate as the ball BL moves back and forth across the table tennis table TB. The cameras 22A, 22B function as what is referred to as a stereo camera.

The camera 22C is installed at a position capable of imaging a racket held by the non-illustrated user.

The state information computation section 24 computes the position and velocity of the ball BL based on captured images of the ball BL as captured by the cameras 22A, 22B. Namely, the state information computation section 24 detects a two-dimensional position of the ball BL in each captured image by performing known image processing such as feature extraction processing on each of two captured images captured from different angles. Based on the two-dimensional positions of the ball BL in the two captured images, what is referred to as a stereo method is applied to compute a three-dimensional position of the ball BL. The state information computation section 24 also computes a movement distance and a movement duration of the ball BL based on the most recent three-dimensional position of the ball BL and a previously computed three-dimensional position of the ball BL, and then computes the velocity of the ball BL based on the computed movement distance and movement duration. Note that the velocity of the ball BL is a vector amount, and includes components in each of three mutually orthogonal axial directions, namely an X axis, a Y axis, and a Z axis.

The state information computation section 24 also computes a rotational velocity (angular velocity in the present exemplary embodiment) as a vector amount of the ball BL based on the position and the velocity of the ball BL.

For example, the state information computation section 24 extracts a feature location on the ball BL based on the captured images of the ball BL, computes a movement speed of the extracted feature location, and computes the rotational velocity of the ball BL based on the computed movement speed. The extracted feature location may be a mark preprinted on part of the ball BL, or may be a mark applied to the ball BL later specifically for use in extraction of the feature location.

Note that a difference between a trajectory of the ball BL as predicted by trajectory prediction processing for the ball BL, described later, when assuming that the ball BL has a rotational velocity of 0 (no spin) and an actual detected trajectory of the ball BL may be computed, and the rotational velocity of the ball BL may be predicted based on this computed difference.

The stroke decision device 30 includes the functionality of an acquisition section 31 and a stroke decision section 32, as illustrated in FIG. 2.

The acquisition section 31 acquires the state information including the position, velocity, and rotational velocity of the incoming ball BL from the sensor section 20.

The stroke decision section 32 decides a stroke condition, including a position, velocity, and orientation of the racket RK at a time point when the ball BL is hit back toward a target arrival position, based on the state information for the ball BL acquired by the acquisition section 31 and the target arrival position for hitting back the ball BL with the racket RK.

As illustrated in FIG. 2, the stroke decision section 32 specifically includes a trajectory prediction section 33, a setting section 34, an arrival position prediction section 35, an adjustment section 36, and a stroke condition computation section 37.

The trajectory prediction section 33 computes trajectory information relating to the predicted trajectory of the ball BL based on the state information for the ball BL.

The setting section 34 uses the trajectory information for the ball BL computed by the trajectory prediction section 33 to set a strike position at which to strike the ball BL, and sets post-strike state information including a post-strike velocity and a post-strike rotational velocity of the ball BL immediately after the ball BL has been struck.

The arrival position prediction section 35 computes a predicted arrival position based on the post-strike state information set by the setting section 34.

The adjustment section 36 adjusts the post-strike velocity set by the setting section 34 so as to bring error between the predicted arrival position computed by the arrival position prediction section 35 and the target arrival position to within a permitted range. Note that the adjustment section 36 may employ a search algorithm to adjust the post-strike velocity to minimize the error between the predicted arrival position computed by the arrival position prediction section 35 and the target arrival position. Examples of such search algorithms include a steepest gradient descent method, a least squares method, a hill climbing method, and an extremal distribution sorting method; however, there is no limitation thereto.

The stroke condition computation section 37 computes a velocity and orientation of the racket RK so as to cause the ball BL to conform to the set post-strike state information when the ball BL conforming to the state information immediately prior to being struck is struck at the set strike position. The state information immediately prior to being struck may include the position, velocity, and rotational velocity of the ball BL as computed by the trajectory prediction section 33 immediately prior to the ball BL being struck, based on the state information acquired by the acquisition section 31.

The setting section 34 may further set either a target duration to arrival, this being a duration spanning from when the ball BL is struck to when the ball BL arrives at the target arrival position, or a target arrival velocity, this being a velocity of the ball BL immediately prior to arriving at the target arrival position, and may also set an initial value of the post-strike velocity prior to adjustment by the adjustment section 36, based on the target duration to arrival or on the target arrival velocity.

The setting section 34 may also set plural post-strike velocities, the arrival position prediction section 35 may compute plural predicted arrival positions corresponding to each of the plural post-strike velocities, and the adjustment section 36 may adjust the post-strike velocity by selecting one post-strike velocity from out of the plural post-strike velocities for which the corresponding error falls within the permitted range. The setting section 34 may also be configured to set the target duration to arrival or the target arrival velocity within a range that does not require the ball-returning robot 10 provided with the racket RK to perform a strike action at a velocity in excess of a velocity limit for the strike action.

The acquisition section 31 may further acquire an actual arrival position where the ball BL actually arrives, and the adjustment section 36 may correct the adjusted post-strike velocity for the next stroke onwards based on the error between the actual arrival position and the predicted arrival position.

The acquisition section 31 may further acquire an actual arrival position where the ball BL actually arrives, and the stroke condition computation section 37 may correct the computed stroke condition for the next stroke onwards based on the error between the actual arrival position and the predicted arrival position.

The robot 40 includes a movable section 41 that supports and moves the racket RK. As illustrated in FIG. 1, the movable section 41 of the present exemplary embodiment includes three robot arms 41A, 41B, and 41C and a support section 42 that supports the racket RK as an example. Namely, the robot 40 is what is referred to as a parallel link robot, and the robot arms 41A, 41B, 41C are controlled in parallel to control the behavior of the racket RK supported by the support section 42 at a leading end of the robot arms 41A, 41B, 41C. The support section 42 includes a drive mechanism to vary the orientation of the racket RK. Note that the robot 40 is not limited to a parallel link robot, and another type of robot may be employed therefor.

The control device 50 controls movement of the movable section 41 so as to hit back the ball BL under the stroke condition decided by the stroke decision device 30.

Figure 3:
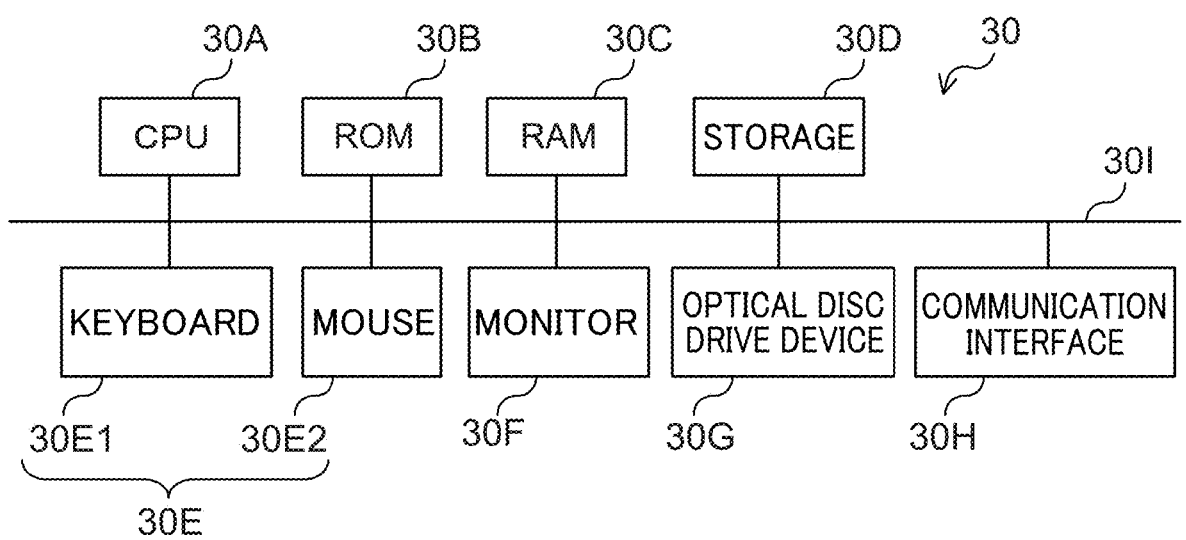
FIG. 3 is a block diagram illustrating a hardware configuration of a stroke decision device.

Next, explanation follows regarding a hardware configuration of the stroke decision device 30, with reference to the block diagram illustrated in FIG. 3.

As illustrated in FIG. 3, the stroke decision device 30 includes a central processing unit (CPU) 30A, read only memory (ROM) 30B, random access memory (RAM) 30C, storage 30D, an input section 30E, a monitor 30F, an optical disc drive device 30G, and a communication interface 30H. Each of these configuration elements are connected together through a bus 301 so as to be capable of communicating with each other.

In the present exemplary embodiment, a stroke decision program is held in either the ROM 30B or the storage 30D. The CPU 30A is a central processing unit that executes various programs and controls various configurations. Namely, the CPU 30A reads a program from the ROM 30B or the storage 30D and executes the program using the RAM 30C as a workspace. The CPU 30A controls the various configurations and performs various computation processing according to the program recorded in the ROM 30B or the storage 30D.

The ROM 30B holds various programs and various data. The RAM 30C serves as a workspace that temporarily stores programs and data. The storage 30D is configured by a hard disk drive (HDD) or a solid state drive (SSD), and holds various programs including an operating system, as well as various data.

The input section 30E includes a keyboard 30E1 and a pointing device such as a mouse 30E2, and is employed to perform various input. The monitor 30F is, for example, a liquid crystal display, and displays various information. The monitor 30F may employ a touch panel so as to function as the input section 30E. The optical disc drive device 30G performs reading and writing of data with respect to various recording media (such as CD-ROMs or Blu-ray discs).

The communication interface 30H is an interface for communicating with other devices, and may employ a protocol such as Ethernet (registered trademark), FDDI, or Wi-Fi (registered trademark).

The respective functional configurations of the stroke decision device 30 illustrated in FIG. 2 are implemented by the CPU 30A reading the stroke decision program stored in the ROM 30B or the storage 30D, and expanding and executing the stroke decision program using the RAM 30C.

Next, explanation follows regarding operation of the stroke decision device 30.

Figure 4:
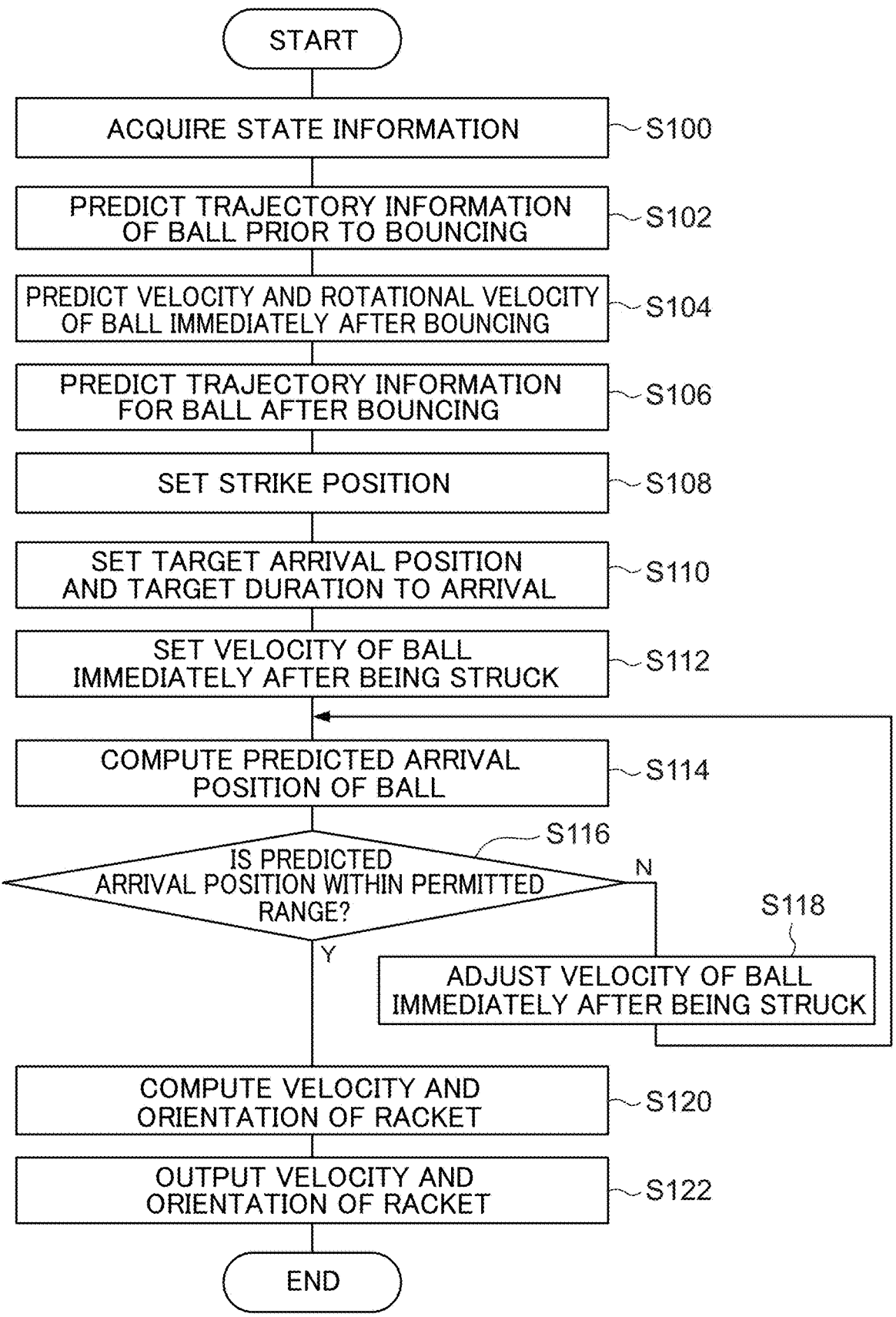
FIG. 4 is a flowchart illustrating a flow of stroke decision processing.

FIG. 4 is a flowchart illustrating a flow of the stroke decision processing executed by the stroke decision device 30. When a user operates the input section 30E to instruct execution of the stroke decision processing, the CPU 30A reads the stroke decision program from the ROM 30B or the storage 30D, and expands and executes the stroke decision program using the RAM 30C in order to execute the stroke decision processing. The stroke decision processing illustrated in FIG. 4 is executed repeatedly until an instruction to end the processing is given.

When the stroke decision processing illustrated in FIG. 4 is executed, the cameras 22A, 22B of the sensor section 20 start imaging, and the state information for the ball BL computed by the state information computation section 24 is sequentially output to the stroke decision device 30 in time series.

At step S100, the CPU 30A functions as the acquisition section 31 in order to sequentially acquire the state information including the position, velocity, and rotational velocity of the incoming ball BL from the sensor section 20 in time series.

Figure 5:
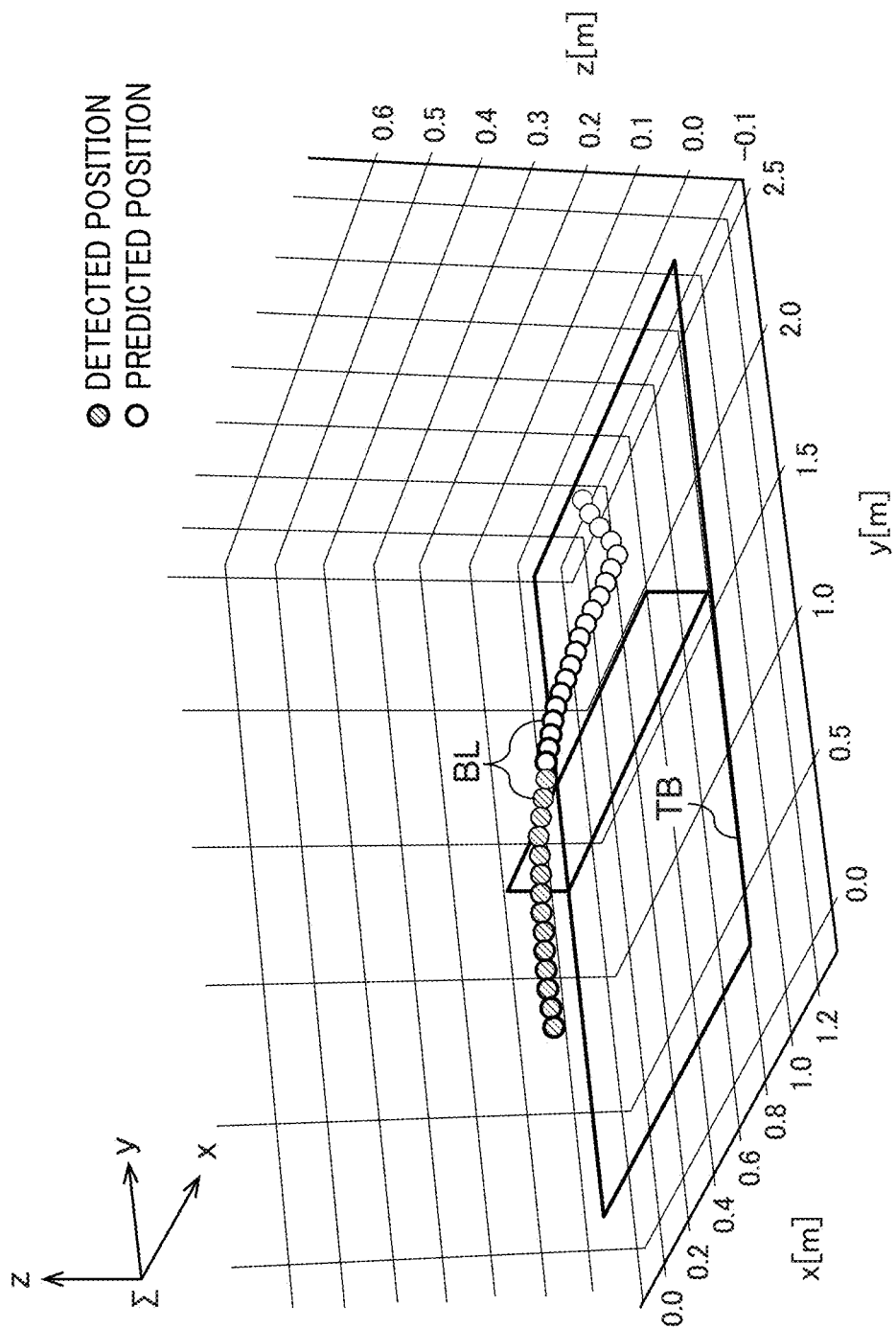
FIG. 5 is a diagram illustrating an example of detected positions and predicted positions of a ball.

At step S102, the CPU 30A functions as the trajectory prediction section 33 in order to predict the trajectory information relating to the predicted trajectory of the ball BL until the ball BL bounces on the table tennis table TB, based on the state information for the ball BL acquired at step S100. Note that the trajectory information relating to the predicted trajectory is information expressing positions, velocities, and rotational velocities of the ball BL in time series, and is predicted using the state information that has been detected in time series up until the present. FIG. 5 illustrates an example of detected positions of the ball BL as detected by the sensor section 20 and predicted positions of the ball BL as predicted by the trajectory prediction section 33. As illustrated in FIG. 5, in the present exemplary embodiment, the table tennis table TB corresponds to a Z axis coordinate of zero. Accordingly, whether or not the ball BL bounces on the table tennis table TB can be determined based on whether or not the ball BL has reached the Z axis coordinate of zero at an X axis coordinate and a Y axis coordinate that fall within an X axis coordinate and Y axis coordinate range of the table tennis table TB.

The trajectory information for the predicted trajectory of the ball BL is more specifically obtained by inputting the position, velocity, and rotational velocity of the ball BL acquired at step S100 into the following aerodynamic Equation and running a time evolution.

$$\ddot{p} = -g - C_D(t)\frac{\rho}{m}S_b\|\dot{p}(t)\|\dot{p}(t) + C_M(t)\frac{\rho}{m}V_b\omega \times \dot{p}(t) \quad \text{Equation (1)}$$

Wherein p(t) is the position of the ball BL. $\dot{p}(t)$ is a velocity obtained by the first derivative of p(t). $\ddot{p}(t)$ is an acceleration obtained as the second derivative of p(t). ω is the rotational velocity of the ball BL. g is gravitational acceleration, this being 9.8 m/s². Sb is the cross-sectional area of the ball BL, this being $\pi r^2$ wherein r is the radius of the ball BL. Vb is the volume of the ball BL, this being $(4/3)\times\pi r^3$. m is the mass of the ball BL, and is, for example, $2.7\times 10^{-3}$ kg. ρ is air density, and is, for example, 1.184 kg/m³ (at 25° C.). $C_D(t)$ is a Drag coefficient, and is, for example, 0.5. $C_M(t)$ is a Magnus coefficient, and is, for example, 0.2.

Figure 6:
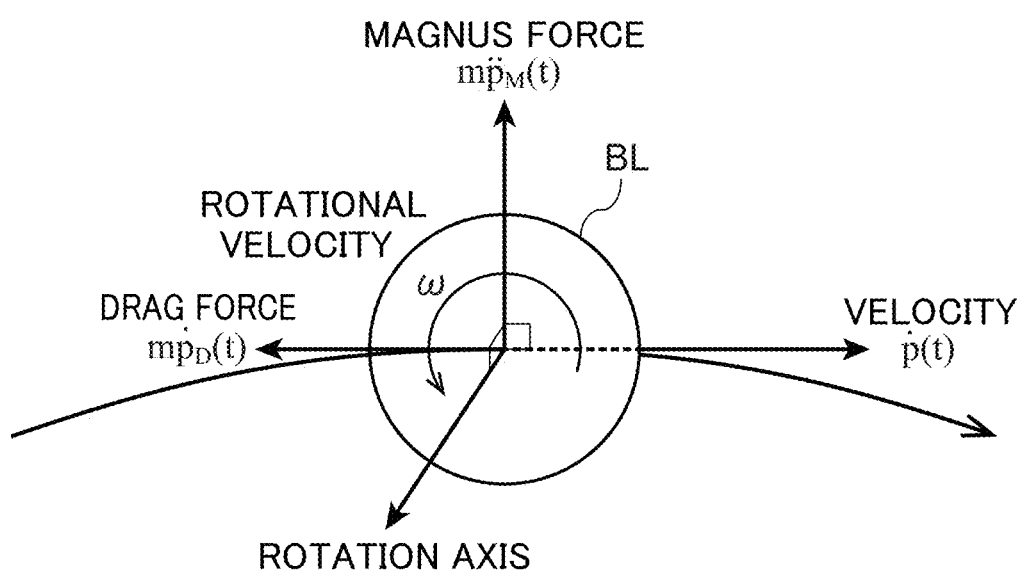
FIG. 6 is a diagram to explain drag force, Magnus force, and the like acting on a ball.

FIG. 6 illustrates a relationship between Drag force, Magnus force, the velocity p(t), and the rotation axis of the ball BL.

Figure 7:
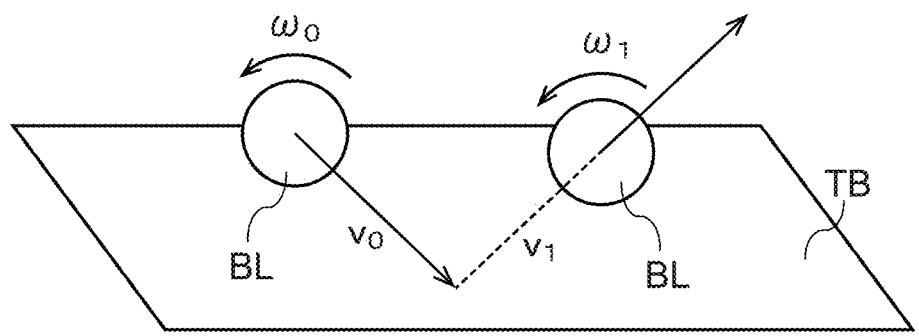
FIG. 7 is a diagram to explain velocity and acceleration of a ball immediately prior to and immediately after bouncing on a table tennis table.

At step S104, the CPU 30A functions as the trajectory prediction section 33 in order to predict the velocity and rotational velocity of the ball BL immediately after bouncing on the table tennis table TB, based on the trajectory information for the predicted trajectory of the ball BL predicted at step S102. Specifically, as illustrated in FIG. 7, a velocity $v_1$ and a rotational velocity on of the ball BL immediately after bouncing on the table tennis table TB are computed by inputting a velocity $v_0$ and a rotational velocity $\omega_0$ of the ball BL immediately prior to bouncing on the table tennis table TB into a table rebound model expressed by the following Equation.

$$v_1 = A_{vv}v_0 + A_{v\omega}\omega_0$$

$$\omega_1 = A_{\omega v}v_0 + A_{\omega\omega}\omega_0 \quad \text{Equation (2)}$$

$A_{vv}$, $A_{v\omega}$, $A_{\omega v}$, and $A_{\omega\omega}$ are expressed by the following Equations.

$$A_{vv} = \begin{bmatrix} 1-\alpha & 0 & 0 \\ 0 & 1-\alpha & 0 \\ 0 & 0 & -\eta \end{bmatrix} \quad \text{Equation (3)}$$

$$A_{v\omega} = \begin{bmatrix} 0 & \alpha*r & 0 \\ -\alpha*r & 0 & 0 \\ 0 & 0 & 0 \end{bmatrix} \quad \text{Equation (4)}$$

$$A_{\omega v} = \begin{bmatrix} 0 & -\frac{3\alpha}{2r} & 0 \\ \frac{3\alpha}{2r} & 0 & 0 \\ 0 & 0 & 0 \end{bmatrix} \quad \text{Equation (5)}$$

$$A_{\omega\omega} = \begin{bmatrix} 1-\frac{3\alpha}{2} & 0 & 0 \\ 0 & 1-\frac{3\alpha}{2} & 0 \\ 0 & 0 & 1 \end{bmatrix} \quad \text{Equation (6)}$$

Note that α is a preset parameter dependent on a friction coefficient between the table tennis table TB and the ball BL. η is a preset rebound coefficient between the table tennis table TB and the ball BL.

A table rebound model expressed by the following Equations may also be employed.

$$\begin{cases} v_{1x} = v_{0x} - (1+\eta)\mu \, \cot\beta(v_{0x} - r\omega_{0y}) \\ v_{1y} = v_{0y} - (1+\eta)\mu \, \cot\beta(v_{0x} + r\omega_{0y}) \\ v_{1z} = -\eta v_{0z} \end{cases} \quad \text{Equation (7)}$$

$$\begin{cases} \omega_{1x} = \omega_{0x} \dfrac{3(1+\eta)}{2r}\mu \, \cot\beta(v_{0y} + r\omega_{0x}) \\ \omega_{1y} = \omega_{0y} + \dfrac{3(1+\eta)}{2r}\mu \, \cot\beta(\{v_{0x} + r\omega_{0y}) \\ \omega_{1z} = \omega_{0z} \end{cases} \quad \text{Equation (8)}$$

β is an angle formed between the ball BL and the table tennis table TB immediately prior to the ball BL bouncing on the table tennis table TB. Note that a table rebound model other than those described above may also be employed.

At step S106, the CPU 30A functions as the trajectory prediction section 33 in order to compute trajectory information for a predicted trajectory after the ball BL has bounced on the table tennis table TB. Namely, the trajectory information for the predicted trajectory of the ball BL after bouncing on the table tennis table TB is computed by inputting the velocity $v_1$ and the rotational velocity on of the ball BL immediately after bouncing on the table tennis table TB computed at step S104 into aerodynamic Equation (1) and running a time evolution.

At step S108, the CPU 30A functions as the setting section 34 in order to set the position of the racket RK (strike position) at the time point of hitting back the ball BL, based on the trajectory information for the predicted trajectory of the ball BL acquired at step S102 and S106. Specifically, any out of a position corresponding to the greatest height of the ball BL on the trajectory of the ball BL after bouncing on the table tennis table TB, the lowest position in a height range in which the racket RK is capable of returning the ball BL, a position where the velocity of the ball BL is slowest in the Z axis direction (height direction), or a position within a movement range of the robot 40 for which return precision is a fixed value or greater, may be adopted as the strike position for hitting the ball BL back toward the target arrival position. Note that a position within the movement range of the robot 40 where the return precision is a fixed value or greater is, for example, set within a range within the movement range of the robot 40 for which the return precision is a fixed value or greater as found based on advance testing or the like.

At step S110, the CPU 30A functions as the setting section 34 in order to set the target arrival position of the ball BL returned with the racket RK, and the target duration to arrival spanning from when the racket RK strikes the ball BL until the ball BL arrives at the target arrival position. A target arrival velocity of the ball BL at the target arrival position may be set as an alternative to the target duration to arrival.

The target arrival position may be a landing position where the ball BL lands on the table tennis table TB, or may be an airborne position above the table tennis table TB, for example above a net of the table tennis table TB. In cases in which the target arrival position is an airborne position, the target arrival position may be set within a limited range above the net for which the ball BL will land on the table tennis table TB.

The target arrival position may, for example, be set in advance, or may be specified in advance by the user. The target arrival position may be specified as a pinpoint location, or may be specified as a range. When specified as a range, the target arrival position may for example be specified using numbers allocated to respective regions obtained by dividing the surface of the table TB on the user side, or an space in the X-Z plane above the net of the table tennis table TB, into m×n regions. In cases in which the target arrival position is specified as a range, for calculation purposes a central position within the specified range may be treated as a specified target arrival position. Moreover, the target arrival position may be fixed, or may be varied in a random fashion with each new rally.

The target duration to arrival or the target arrival velocity may be found based on the distance between the strike position set at step S108 and the target arrival position, employing a predetermined relationship formula or data in a table. Alternatively, the target duration to arrival or the target arrival velocity may be specified in advance by the user.

At step S112, the CPU 30A functions as the setting section 34 in order to set the velocity of the ball BL at the time point when the ball BL is hit back at the strike position set at step S108, namely the velocity of the ball BL immediately after being struck. This set velocity serves as an initial value when finding the post-strike velocity.

The initial value of the post-strike velocity set here may be computed from the target duration to arrival or the target arrival velocity set at step S110. Specifically, a velocity $v_1$ ($v_{x1}$, $v_{y1}$, $v_{z1}$) of the ball BL immediately after being struck with the racket RK is computed by inputting a coordinate value $p_1$ ($p_{x1}$, $p_{y1}$, $p_{z1}$) of the strike position of the ball BL, a coordinate value $p_2$ ($p_{x2}$, $p_{y2}$, $p_{z2}$) of the target arrival position, a timing $t_1$ when the ball BL is at the strike position $p_1$, and a timing $t_2$ when the ball BL is at the target arrival position $p_2$ into the following Equation expressing simple aerodynamics. Note that the timing $t_2$ is obtained by incrementing the timing $t_1$ by the target duration to arrival.

$$\begin{cases} v_{x1} = \dfrac{\exp\{D(p_{x2} - p_{x1})\} - 1}{D(t_2 - t_1)}, \\ v_{y1} = \text{sgn}(p_{y2} - p_{y1})\dfrac{\exp\{D(p_{y2} - p_{y1})\} - 1}{D(t_2 - t_1)}, \\ v_{z1} = \dfrac{1}{2}g(t_2 - t_1) - \dfrac{p_{z1}}{t_2 - t_1}, \end{cases} \quad \text{Equation (9)}$$

Note that D is a term relating to drag force, and is expressed by the following Equation. sgn ( ) is a sign function.

$$D = C_D(t)\dfrac{\rho}{m}S_b \quad \text{Equation (10)}$$

$S_b$, m, ρ, and $C_D(t)$ are defined as follows.

$$S_b = \dfrac{1}{2}\pi r^2$$

$m = 2.7 \times 10^{-3}$ kg $\rho = 1.184$ kg/$m^3$ (25° C.)

$C_D(t) = 0.5$

At step S114, the CPU 30A functions as the arrival position prediction section 35 in order to compute the predicted arrival position of the ball BL when the ball BL is hit back at the post-strike velocity set at step S112 from the strike position decided at step S108.

Specifically, trajectory information of the ball BL is predicted by inputting the post-strike velocity set at step S112 and the post-strike rotational velocity of the ball BL into aerodynamic Equation (1) as described above, and running a time evolution. Note that the post-strike rotational velocity of the ball BL input into Equation (1) is, for example, set to a value within a fixed range, referenced against the rotational velocity of the ball BL immediately prior to being struck with the racket RK. Next, the predicted arrival position of the ball BL is identified based on the predicted trajectory information.

At step S116, the CPU 30A functions as the adjustment section 36 in order to determine whether or not the error between the predicted arrival position predicted at step S114 and the target arrival position is within a predetermined permitted range. Namely, the CPU 30A determines whether or not the error between the predicted arrival position computed at step S114 and the target arrival position is a predetermined threshold value or lower. Note that in cases in which the target arrival position has been specified as a range, the error may be determined to be within the permitted range if the predicted arrival position is within the target arrival position range.

Processing transitions to step S118 in cases in which the predicted arrival position is outside the permitted range, and processing transitions to step S120 in cases in which the predicted arrival position is within the permitted range.

At step S118, the CPU 30A functions as the adjustment section 36 in order to adjust the velocity $v_1$ of the ball BL immediately after being struck with the racket RK such that the predicted arrival position approaches the target arrival position, and then processing returns to step S114. The post-strike velocity $v_1$ found by performing the loop of step S114, step S116, and step S118 may, for example, be found employing a search algorithm based on any out of a steepest gradient descent method, a least squares method, a hill climbing method, or an extremal distribution sorting method.

For example, an evaluation function E(v) in which the target arrival position is denoted pA and the predicted arrival position is denoted $p_B$ may be defined as in the following Equation, and the velocity v when E(v) is a minimum found.

$$E(v)=|p_A-p_B| \quad \text{Equation (11)}$$

However, due to E(v) being a non-linear and not algebraic differentiable function, the steepest gradient descent method expressed by the following Equations is for example solved numerically to find the velocity v when E(v) is a minimum found.

$$v = v - \rho(n) * \frac{\partial E(v)}{\partial v} \quad \text{Equation (12)}$$

$$\frac{\partial E(v)}{\partial v} = \begin{bmatrix} \frac{\partial E(v)}{\partial v_x} \\ \frac{\partial E(v)}{\partial v_y} \\ \frac{\partial E(v)}{\partial v_z} \end{bmatrix} = \begin{bmatrix} \frac{E(v+dv_x)-E(v)}{dv_x} \\ \frac{E(v+dv_y)-E(v)}{dv_y} \\ \frac{E(v+dv_z)-E(v)}{dv_z} \end{bmatrix} \quad \text{Equation (13)}$$

$$dv_x=[dv_x\ 0\ 0] \quad \text{Equation (14)}$$

$$dv_y[0\ dv_y\ 0] \quad \text{Equation (15)}$$

$$dv_z=[0\ 0\ dv_z] \quad \text{Equation (16)}$$

$$dv_x,dv_y,dv_z=0.1 \quad \text{Equation (17)}$$

ρ (n) is a rate of learning, and is expressed by the following Equations.

$$\rho(n)=\exp(-a*n)+0.1$$

$$a = -\frac{1}{10}\log(0.4) \quad \text{Equation (19)}$$

For example, a is set such that ρ=0.5 when n=10.

At step S120, the CPU 30A functions as the stroke condition computation section 37 in order to decide the stroke condition by computing the velocity and orientation of the racket RK at the time point of hitting back the ball BL.

Specifically, based on the trajectory information of the ball BL, a velocity V of the racket RK is computed by inputting the velocity $v_0$ and the rotational velocity $\omega_0$ of the ball BL immediately prior to the ball BL being struck with the racket RK and the velocity $v_1$ and the rotational velocity on of the ball BL immediately after the ball BL being struck with the racket RK into the following Equation (18) that expresses a racket rebound model. Angles α, β expressing the orientation of the racket RK are then computed using Equation (21) and Equation (22) below.

Figure 8:
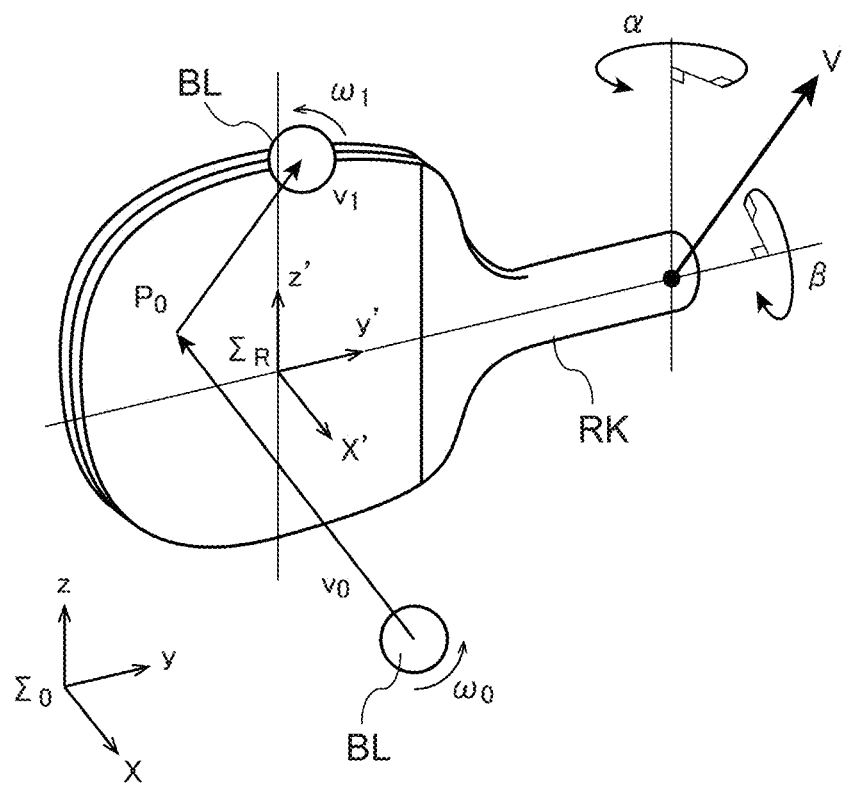
FIG. 8 is a diagram to explain velocity and angles of a racket.

FIG. 8 illustrates an example of the racket RK immediately prior to striking the ball BL and immediately after striking the ball BL. As illustrated in FIG. 8, the angle α is a rotation angle of the racket RK about a z' axis in a case in which a face of the racket RK lies in a z' axis-y' axis plane, and the angle β is a rotation angle about a rotation axis running along the y' axis.

$$V=v_0+R_R(1-A_{vv})^{-1}(R_R^T(v_1-v_0)-A_{v\omega}R_R^T\omega_0) \quad \text{Equation (20)}$$

$$\alpha = -\cos^{-1}\left(\frac{\eta_y - \xi_x * \sin\beta}{\xi_z * \cos\beta}\right) \quad \text{Equation (21)}$$

$$\beta = \sin^{-1}\left(\frac{-b \pm \sqrt{b^2 - ac}}{a}\right) \quad \text{Equation (22)}$$

Note that $R_R$ is a rotation matrix relating to the angles α, β, and is expressed by the following Equation.

$$R_R = \begin{bmatrix} \cos\alpha\cos\beta & -\sin\alpha & \cos\alpha\sin\beta \\ \sin\alpha\cos\beta & \cos\alpha & \sin\alpha\sin\beta \\ -\sin\beta & 0 & \cos\beta \end{bmatrix} \quad \text{Equation (23)}$$

I is an identity matrix expressed by the following Equation.

$$I = \begin{pmatrix} 1 & 0 & 0 \\ 0 & 1 & 0 \\ 0 & 0 & 1 \end{pmatrix} \quad \text{Equation (24)}$$

ξ, η, a, b, and c are intermediate variables, and are expressed by the following Equations.

$$\xi = \frac{k\omega * r}{kv} * (v_1 - v_0) \quad \text{Equation (25)}$$

$$\eta=\omega_1-\omega_0 \quad \text{Equation (26)}$$

$$a = \xi_x^2 + \xi_y^2 + \xi_z^2 \quad \text{Equation (27)}$$

$$b = \eta_x * \xi_y - \eta_y * \xi_x \quad \text{Equation (28)}$$

$$c = \eta_x^2 + \eta_y^2 - \xi_z^2 \quad \text{Equation (29)}$$

kω is a friction coefficient relating to rotation, and kv is a friction coefficient relating to velocity.

At step S122, the velocity V of the racket RK and the angles α, β of the racket RK decided at step S120 are output to the control device 50. The control device 50 controls the movable section 41 such that the racket RK hits back the ball BL at the velocity V and at the angles α, β. The ball BL is thus hit back toward the vicinity of the target arrival position.

In this manner, in the present exemplary embodiment, not only the position and velocity but also the rotational velocity of the ball BL are acquired, and the acquired rotational velocity is taken into consideration when deciding the stroke of the racket RK. This enables a stroke to be decided that enables the ball to be returned toward the target arrival position with good precision even when the ball is applied with spin.

Modified Example 1

Next, explanation follows regarding a Modified Example 1 of the present exemplary embodiment.

The velocity V of the racket RK computed at step S120 in FIG. 4 may on occasion exceed the velocity limit of the strike action of the ball-returning robot 10. In such cases, the target duration to arrival set at step S110 may be adjusted, namely the target duration to arrival may be lengthened, when executing the processing of step S110 to step S120. The stroke condition is thus decided within a velocity limit range of the robot 40 such that the error between the predicted arrival position and the target arrival position falls within the permitted range.

Modified Example 2

Next explanation follows regarding a Modified Example 2 of the present exemplary embodiment.

Plural target durations to arrival may be set with reference to the target duration to arrival set at step S110 in FIG. 4, and the processing of step S112 to step S120 may be executed for each of the plural target durations to arrival. For example, if the target duration to arrival set at step S110 is denoted T, n target durations to arrival may be set, in the format T, T+Δt, T+2Δt, T+3Δt, . . . T+nΔt. In such cases, at step S112 $n$ velocities are set as the velocity V corresponding to the target durations to arrival T, in the format V, V+Δv, V+2Δv, V+3Δv, . . . V+nΔv.

Then, at step S114, predicted arrival positions are computed for each of the plural velocities. Note that the parallel processing may be executed for step S114. Processing transitions to step S120 if at least one out of the plural predicted arrival positions computed at step S114 is within the permitted range at step S116. In such cases, at step S120 at least one predicted arrival position within the permitted range is selected as the predicted arrival position. For example, the predicted arrival position closest to the target arrival position may be selected from out of the predicted arrival positions within the permitted range. The velocity and orientation of the racket RK are then computed based on the velocity of the ball BL immediately after being struck corresponding to the selected predicted arrival position. Note that alternatively, the predicted arrival position giving the shortest predicted duration to arrival may be selected from out of the predicted arrival positions within the permitted range, or the predicted arrival position giving the longest predicted duration to arrival may be selected from out of the predicted arrival positions within the permitted range.

On the other hand, in cases in which all of the plural predicted arrival positions are outside of the permitted range, processing transitions to step S118. In such cases, the velocity of the ball BL immediately after being struck with the racket RK is adjusted for each of the plural predicted arrival positions.

In this manner, the stroke condition is decided such that at least one error out of the errors between the plural predicted arrival positions and the target arrival position falls within the permitted range.

Modified Example 3

Next, explanation follows regarding a Modified Example 3 of the present exemplary embodiment.

After outputting the velocity and the racket angles α, β of the racket RK at step S122 in FIG. 4, the actual arrival position where the ball BL actually arrives may be detected by the sensor section 20, this detected actual arrival position may be acquired, and the post-strike velocity adjusted by the adjustment section 36 may be corrected for the next stroke onwards based on the error between the actual arrival position and the predicted arrival position. Even if the target arrival position is different for each shot, since the error between the actual arrival position and the predicted arrival position tends to follow a similar pattern, correcting the post-strike velocity so as to reduce the error for the next stroke onwards enables the arrival precision with respect to the target arrival position to be increased. By repeatedly measuring the error between the actual arrival position and the predicted arrival position and correcting the post-strike velocity based thereon for each shot, the arrival precision can be progressively raised. Note that a correction amount may be varied according to the target arrival position and the post-strike velocity. Correction amounts may also be derived using machine learning.

As an alternative to correcting the post-strike velocity, the stroke condition computation section 37 may correct a stroke condition of the racket RK, namely at least one out of the position, velocity, and orientation of the racket RK. So doing similarly enables the arrival precision at the target arrival position to be increased.

Modified Example 4

Next, explanation follows regarding a Modified Example 4.

In the present exemplary embodiment, explanation has been given regarding a case in which the stroke decision section 32 decides the stroke by predicting the trajectory of the ball BL using aerodynamic modeling, table rebound modeling, and the like. However, the stroke decision section 32 may decide the stroke condition using a trained model.

For example, the stroke decision section 32 may be configured including a trained model trained using the state information for the ball BL acquired by the acquisition section 31 and the target arrival position as inputs, and having the stroke condition, namely the position, velocity V, and angles α, β of the racket RK at the time point when hitting back the ball BL, as an output. This enables calculations using aerodynamic modeling, table rebound modeling, and the like to be omitted.

Note that although in the present exemplary embodiment explanation has been given regarding a case in which the control of the control device 50 is applied to the robot 40 as a real device, the control of the control device 50 may be applied to a robot that performs simulated actions.

Moreover, although in the present exemplary embodiment explanation has been given regarding a case in which the ball-returning robot 10 is a table tennis robot, there is no limitation thereto. For example, the ball-returning robot 10 may be applied to other ball-based sports and games, for example as a tennis robot that hits back a tennis ball or a baseball robot that hits back a baseball ball with a bat. In the case of a baseball robot, for example application may be made so as to offer advice to a user regarding what type of stroke should be deployed to hit a pitched ball back to a target arrival position. Moreover, there is no limitation to a striking implement such as a racket being supported by the support section 42. For example, the leading end of the robot arm may be configured in the shape of a striking implement.

Moreover, the stroke decision processing executed by the CPU reading software (a program) in the exemplary embodiment described above may be executed by various types of processor other than the CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The stroke decision processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although the stroke decision program is stored in advance (installed) in the storage 30D or the ROM 30B in the exemplary embodiment described above, there is no limitation thereto. This program may be provided in a format recorded on a recording medium such as compact disc read only memory (CD-ROM), digital versatile disc read only memory (DVD-ROM), or universal serial bus (USB) memory. Alternatively, the program may be provided in a format downloadable from an external device over a network.

What is claimed is:

1. A stroke decision device, comprising:
a processor;
a memory configured to programs executed by the processor to cause the stroke decision device to provide:
an acquisition section configured to acquire state information including a position, a translational velocity, and a rotational velocity of an incoming ball; and
a stroke condition decision section configured to decide a stroke condition to control movement of a striking implement of a ball-returning robot which is configured to hit back the incoming ball, the stroke condition including a position, a velocity, and an orientation of the striking implement of the ball-returning robot at a time point of hitting back the ball toward a target arrival position, based on the state information for the ball and the target arrival position when hitting back the ball with the striking implement, wherein the stroke condition decision section includes:
a trajectory prediction section configured to compute trajectory information relating to a predicted trajectory of the incoming ball based on the state information for the ball;
a setting section configured to employ the trajectory information to set a strike position of the ball and to set post-strike state information including a post-strike velocity and a post-strike rotational velocity of the ball immediately after being struck;
an arrival position prediction section configured to compute a predicted arrival position based on the post-strike state information;
an adjustment section configured to adjust the post-strike velocity such that an error between the predicted arrival position and the target arrival position is within a permitted range; and
a stroke condition computation section configured to compute the velocity and the orientation of the striking implement such that the ball will conform to the post-strike state information when the ball conforming to the state information immediately prior to being struck is struck at the strike position; and
a communication interface configured to send the stroke condition to a control device to control the movement of the striking implement of the ball-returning robot.

2. The stroke decision device of claim 1, wherein the setting section is further configured to set either a target duration to arrival, this being a duration from when the ball is struck to when the ball arrives at the target arrival position, or a target arrival velocity, this being a velocity of the ball immediately prior to arriving at the target arrival position, and is further configured to set an initial value of the post-strike velocity prior to adjustment by the adjustment section based on the target duration to arrival or the target arrival velocity.

3. The stroke decision device of claim 2, wherein the setting section is configured to set the target duration to arrival or the target arrival velocity within a range that does not require a ball-returning robot provided with the striking implement to perform a strike action at a velocity exceeding a velocity limit for the strike action.

4. The stroke decision device of claim 1, wherein the adjustment section is configured to employ a search algorithm so as to adjust the post-strike velocity such that the error is minimized.

5. The stroke decision device of claim 1, wherein:
the setting section is configured to set a plurality of the post-strike velocities;
the arrival position prediction section is configured to compute a plurality of the predicted arrival positions respectively corresponding to the plurality of post-strike velocities; and
the adjustment section is configured to adjust the post-strike velocity by selecting, from the plurality of post-strike velocities, one of the post-strike velocities for which the corresponding error is within the permitted range.

6. The stroke decision device of claim 1, wherein:
the acquisition section is further configured to acquire an actual arrival position at which the ball actually arrives; and
the adjustment section is further configured to correct the adjusted post-strike velocity for a next stroke onwards based on an error between the actual arrival position and the predicted arrival position.

7. The stroke decision device of claim 1, wherein:
the acquisition section is further configured to acquire an actual arrival position at which the ball actually arrives; and
the stroke condition computation section is further configured to correct the computed stroke condition for a next stroke onwards based on an error between the actual arrival position and the predicted arrival position.

8. A stroke decision method in which a computer executes processing, the processing comprising:
acquiring state information including a position, a translational velocity, and a rotational velocity of an incoming ball;
deciding a stroke condition to control movement of a striking implement of a ball-returning robot which is configured to hit back the incoming ball, the stroke condition including a position, a velocity, and an orientation of the striking implement of the ball-returning robot at a time point of hitting back the ball, based on the state information for the ball and a target arrival position when hitting back the ball with the striking implement; and
sending, via a communication interface, the stroke condition to a control device to control the movement of the striking implement of the ball-returning robot,
wherein the deciding a stroke condition includes:
computing trajectory information relating to a predicted trajectory of the incoming ball based on the state information for the ball;
employing the trajectory information to set a strike position of the ball and to set post-strike state information including a post-strike velocity and a post-strike rotational velocity of the ball immediately after being struck;
computing a predicted arrival position based on the post-strike state information;
adjusting the post-strike velocity such that an error between the predicted arrival position and the target arrival position is within a permitted range; and
computing the velocity and the orientation of the striking implement such that the ball will conform to the post-strike state information when the ball conforming to the state information immediately prior to being struck is struck at the strike position.

9. A non-transitory recording medium storing a stroke decision program that is executable by a computer to perform processing, the processing comprising:
acquiring state information including a position, a translational velocity, and a rotational velocity of an incoming ball; and
deciding a stroke condition to control movement of a striking implement of a ball-returning robot which is configured to hit back the incoming ball, the stroke condition including a position, a velocity, and an orientation of the striking implement of the ball-returning robot at a time point of hitting back the ball, based on the state information for the ball and a target arrival position when hitting back the ball with the striking implement; and
sending, via a communication interface, the stroke condition to a control device to control the movement of the striking implement of the ball-returning robot,
wherein the deciding a stroke condition includes:
computing trajectory information relating to a predicted trajectory of the incoming ball based on the state information for the ball;
employing the trajectory information to set a strike position of the ball and to set post-strike state information including a post-strike velocity and a post-strike rotational velocity of the ball immediately after being struck;
computing a predicted arrival position based on the post-strike state information;
adjusting the post-strike velocity such that an error between the predicted arrival position and the target arrival position is within a permitted range; and
computing the velocity and the orientation of the striking implement such that the ball will conform to the post-strike state information when the ball conforming to the state information immediately prior to being struck is struck at the strike position.

10. A ball-returning robot, comprising:
a stroke decision device comprising:
an acquisition section configured to acquire state information including a position, a translational velocity, and a rotational velocity of an incoming ball; and
a stroke condition decision section configured to decide a stroke condition including a position, a velocity, and an orientation of a striking implement at a time point of hitting back the ball toward a target arrival position, based on the state information for the ball and the target arrival position when hitting back the ball with the striking implement;
a striking implement configured to hit back an incoming ball;
a movable section configured to support and move the striking implement; and
a control device configured to control movement of the movable section so as to hit back the ball in accordance with a stroke condition decided by the stroke decision device,
wherein the stroke condition decision section includes:
a trajectory prediction section configured to compute trajectory information relating to a predicted trajectory of the incoming ball based on the state information for the ball;
a setting section configured to employ the trajectory information to set a strike position of the ball and to set post-strike state information including a post-strike velocity and a post-strike rotational velocity of the ball immediately after being struck;
an arrival position prediction section configured to compute a predicted arrival position based on the post-strike state information;
an adjustment section configured to adjust the post-strike velocity such that an error between the predicted arrival position and the target arrival position is within a permitted range; and
a stroke condition computation section configured to compute a velocity and an orientation of the striking implement such that the ball will conform to the post-strike state information when the ball conforming to the state information immediately prior to being struck is struck at the strike position.

* * * * *